United States Patent [19]

Johnson

[11] Patent Number: 5,774,531
[45] Date of Patent: Jun. 30, 1998

[54] TELECOMMUNICATIONS SYSTEM AND METHOD FOR AUTOMATIC CALL PROCESSING ACCORDING FOREGOING INBOUND AND OUTBOUND CALLS TO ARBITRARY DELEGATES

[75] Inventor: William J. Johnson, Flower Mound, Tex.

[73] Assignee: MCI Communications Corporation, Washington, D.C.

[21] Appl. No.: 701,470

[22] Filed: Aug. 21, 1996

[51] Int. Cl.[6] .............................................. H04M 15/00
[52] U.S. Cl. ...................... 379/113; 379/112; 379/114; 379/93.02
[58] Field of Search .................... 379/111, 112, 379/113, 133, 265, 266, 92.02, 89, 95, 126, 198, 200, 201, 157, 161, 207; 395/200.33, 200.49, 200.56, 601, 800.14, 800.01; 707/7, 5, 3, 100

[56] References Cited

U.S. PATENT DOCUMENTS

| | | | |
|---|---|---|---|
| 5,218,632 | 6/1993 | Cool | 379/112 |
| 5,285,494 | 2/1994 | Sprecher et al. | 379/112 |
| 5,311,507 | 5/1994 | Bedrossian | 379/204 |
| 5,430,709 | 7/1995 | Galloway | 379/113 |
| 5,440,621 | 8/1995 | Castro | 379/112 |
| 5,509,055 | 4/1996 | Ehrlich et al. | 379/113 |
| 5,535,261 | 7/1996 | Brown et al. | 379/114 |
| 5,537,611 | 7/1996 | Rajagopal et al. | 379/113 |
| 5,544,229 | 8/1996 | Creswell et al. | 379/112 |
| 5,544,236 | 8/1996 | Andruska et al. | 379/112 |
| 5,579,379 | 11/1996 | D'Amico et al. | 379/111 |
| 5,623,540 | 4/1997 | Morrison et al. | 379/115 |
| 5,671,408 | 9/1997 | McBride | 379/113 |
| 5,677,945 | 10/1997 | Mullins et al. | 379/113 |
| 5,680,446 | 10/1997 | Fleischer, III et al. | 379/114 |
| 5,684,863 | 11/1997 | Katz | 379/112 |

*Primary Examiner*—Pal Loomis
*Assistant Examiner*—Rexford N. Barnie

[57] ABSTRACT

In a network of a telecommunications service provider, a system processes telephone calls according to foregoing inbound and outbound calls to arbitrary delegates. The system includes a database having a computer-readable file of user journals corresponding to telephone numbers of service subscribers. Each journal has lists of inbound and outbound telephone numbers associated with calls made to/from a particular telephone of the service subscriber. In addition, the user journal includes a list specifying telephone numbers of third-party subscribers who are authorized to perform various call processing operations on the inbound and outbound lists of the subscriber. The call processing operations representatively include browsing through the inbound and outbound lists of the subscriber and auto-dialing any number on the lists. Also provided is a method for processing telephone calls in accordance with the above system.

15 Claims, 5 Drawing Sheets

TELECOMMUNICATIONS SYSTEM AND METHOD FOR AUTOMATIC CALL PROCESSING ACCORDING FOREGOING INBOUND AND OUTBOUND CALLS TO ARBITRARY DELEGATES

FIELD OF THE INVENTION

This invention relates to telecommunications systems and, in particular, a system and method for delegating rights to a telephone user in the network so that the user can access the delegating users phone resources or features, and for automatically browsing and dialing the last number placed to or from an arbitrary telephone in the network, provided that the user has been previously delegated the right of access to a user journal associated with that arbitrary telephone.

BACKGROUND OF THE INVENTION

It is well known that automatic re-dialing of the last number dialed is widely available in some conventional push button phones. This feature saves a calling party time from re-dialing the same number over and over again in the event that the line of a called party is busy. A simple push of an automatic redial button invokes the same call automatically by invoking the saved last outbound number. Facsimile devices also provide an automatic redial capability in order to transmit a fax at the first opportune moment to a device which has been busy.

A first user may also want to dial the number of a second user who previously called him or her. For example, the first user receives a telephone call from a second user and the call terminates. Later, the first user wants to call back the second user. It is desirable to have a function which allows automatic re-dialing of a saved last inbound number (i.e. caller id).

Furthermore, another user may want to automatically redial a last inbound or outbound number associated with some other user's telephone line. For example, a first business partner makes a call to, or receives a call from, an important client, and during the conversation it is determined that a second business partner must handle the situation. A system and method are needed for the second business partner to automatically dial the number of the client. A system and method are also needed for maintaining privacy, so that only the second business partner can auto-dial numbers made to and/or from the first business partner's telephone.

Further still, a first user may want to automatically dial a telephone number selected from any of the foregoing inbound or outbound calls associated with any other telephone number, such as one of the first user's other telephone numbers or some other user's telephone number. A system and method are needed for accomplishing that. For example, an employee has been delegated managerial responsibility which involves handling telephone messages, facsimile messages, etc. Telephone callers leaving phone messages may assume that the manager is taking their messages and may not leave a phone number at which they can be reached. Similarly, facsimile letters sent to the manager may not have a return fax number, yet a fax reply is required. A system and method are needed for the employee, for example, to be able to properly handle these situations in a convenient manner. A system and method are also needed for the manager to grant or deny to others the use of or access to his/her inbound or outbound information.

A need, therefore, exists for a system and method which provide all of the above features in a telecommunications network.

SUMMARY OF THE INVENTION

These and other features and advantages are accomplished by a telecommunications system and method for automatic call processing according to foregoing inbound and outbound calls to arbitrary delegates. The inventive system includes at least one switching office, located in a network of a telecommunications service provider, for establishing a voice path between a calling and a called party. Telecommunications service subscribers, including the calling party, are connected to a switching office (not necessarily the same), desiring to obtain a voice communication among themselves. Located in the switching office according to the present invention, a processor carries out a sequence of instructions embodied in a computer-readable medium. A database, connected to the processor, provides a computer file which includes a computer-readable information about a service subscriber. The computer-readable information is arranged as a user journal corresponding to the service subscriber. The user journal includes a first list comprising telephone numbers of a first set of service subscribers initiating a telephone call to the service subscriber, a second list comprising telephone numbers of a second set of service subscribers receiving a telephone call from the service subscriber, and a third list comprising telephone numbers of a third set of service subscribers who are authorized to access the first and second lists. The processor, responsive to the sequence of instructions generated from commands which are input by a user, accesses the database to perform a call processing function using either the first list or the second list.

In accordance with one aspect of the present invention, the database may be locally or remotely located with respect to the switching office.

In accordance with another aspect of the present invention, the system includes a second switching office located in the network. The called party is connected to the second switching office, and the remotely located database includes the user journal for the called party.

In accordance with yet another aspect of the present invention, the user journal further comprises a list containing information selected from the following: billing information of the user, a date and a time recordation of the telephone call received from a service subscriber, a date and a time recordation of a telephone call placed to a service subscriber, a name and an address of a calling and called party, and a frequency of the subscriber's telephone use. An alternate embodiment will interface to such statistical data in native forms already contained elsewhere in the telecommunications network.

In accordance with still another aspect of the present invention, a request for carrying out the call processing function is input via a telephone keypad. The keypad is used as an interface by a subscriber who presses appropriate keys on the keypad in response to a menu-driven program. Alternatively, a request for carrying out the call processing function may be input via an audio response unit (ARU). Similar to the keypad, the ARU is used as an interface by the subscriber who vocalizes the selection of the call processing function in response to a menu-driven program.

BRIEF DESCRIPTION OF THE DRAWINGS

The above-mentioned as well as additional advantages and features of the present invention will be evident and more clearly understood when considered in conjunction with the accompanying drawings, in which.

In all Figures, like reference numerals represent same or identical components of the present invention.

DESCRIPTION OF THE PREFERRED EMBODIMENTS

Figure 1:
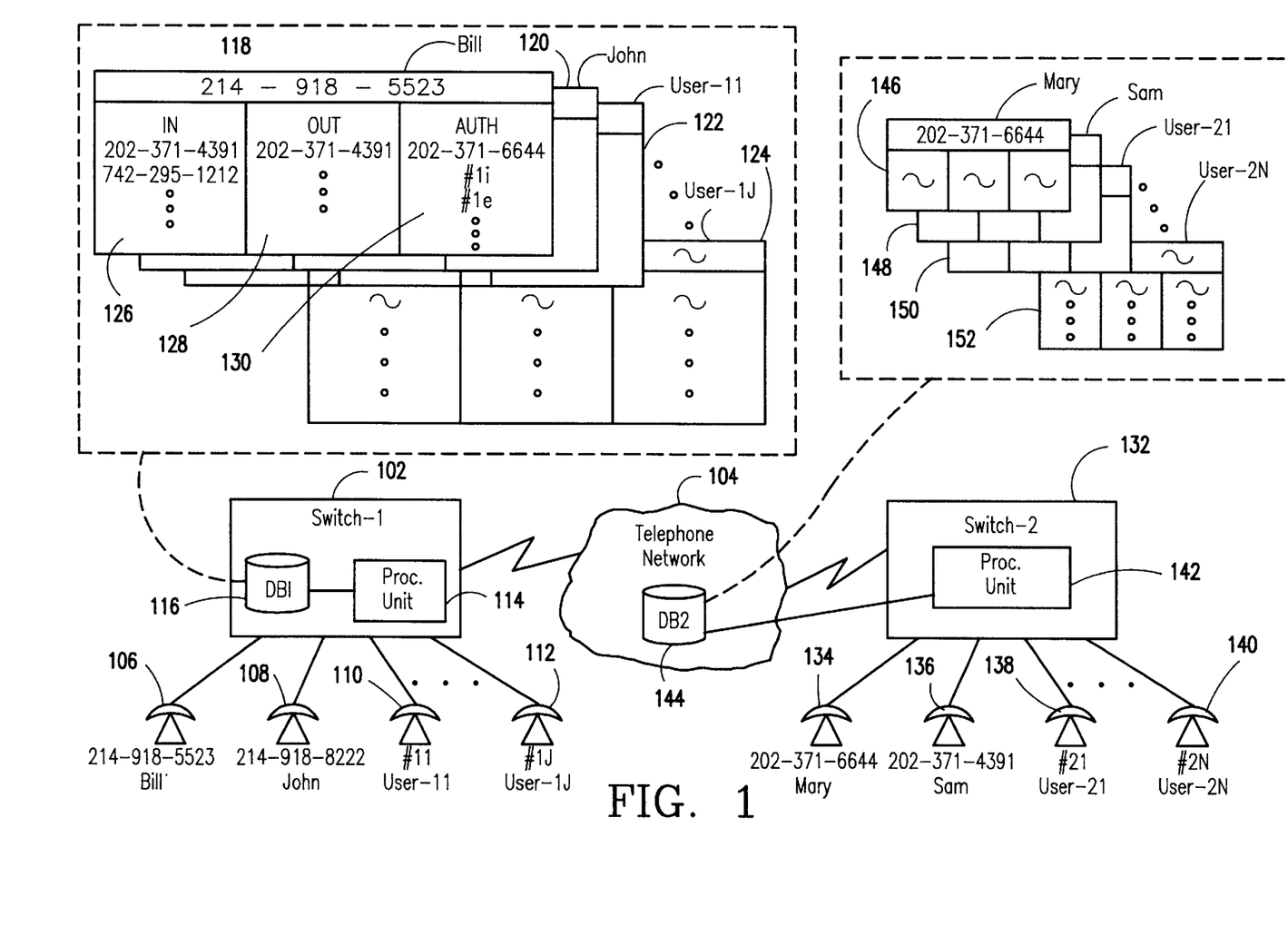
FIG. 1 illustrates a block diagram of an administration aspect of a system for automatic call processing according to foregoing inbound and outbound calls to arbitrary delegates in accordance with one embodiment of the present invention.

To facilitate the understanding of the present invention, a general overview in the block diagram form is shown in FIG. 1. An exemplary embodiment of the present invention includes a switching office, Switch-1 102, of the Local Exchange Carrier (LEC) of a public switched telephone network 104. As well known to people skilled in the art, the switching office selects paths and closes and opens appropriate electrical circuits for establishing voice path between service subscribers (users). Thus, users Bill 106 and John 108 are connected to the local Switch-1 102 that handles their local calling area. It is understood, of course, that other multiple subscribers, such as User-1I 110 and User-1J 112 may also be connected to the local Switch-1 102.

As further shown in FIG. 1, Switch-1 102 has, among other things, processing unit 114 and a database DB1 116. While processing unit 114 may perform the switching operations in addition to accessing DB1 116 in accordance with the present invention, it is not necessary that both the switching operation and database access be carried out by the same processing unit.

The database DB1 116 contains, among other things, user journals 118, 120, 122, 124, preferably stored on a Direct Access Storage Device, for each user served by Switch-1 102. That is, user journal 118 corresponds to user Bill 106 having the telephone number 214-918-5523, as shown in FIG. 1. Similarly, user journal 120 is associated with user John 108 with the telephone number 214-918-8222, while user journals 122 and 124 correspond to User-1I having the telephone number #1I (symbolically), and User-1J with the telephone number #1J (symbolically), respectively. It is understood, of course, that User-1I and User-1J represent any arbitrary service subscriber of the LEC, which are served by Switch-1 102, while telephone numbers #1I and #1J of User-1I and User-1J designate, respectively, appropriate telephone numbers for the local area of Switch-1 102.

FIG. 1 further shows that each user journal includes a plurality of lists, such as Inbound list 126, Outbound list 128 and Authorization list 130. Inbound list 126 specifies telephone numbers of those subscribers who have called Bill's telephone number, i.e., 214-918-5523. Similarly, Outbound list 128 contains telephone numbers of those subscribers who have been called by Bill. The last list of FIG. 1, i.e., Authorization list 130, includes telephone numbers of the subscribers who are authorized to access this journal and perform various call processing functions, as will be fully explained below.

Although lists within a user journal of FIG. 1 are representatively arranged in a particular order, i.e., Inbound list 126 followed by Outbound list 128 and Authorization list 130, it is understood that any list order can be maintained within a database by skilled artisans. Furthermore, other additional lists may be included in a user journal, such as user billing information and/or statistical information, or appropriate pointers thereto, as well as other user attributes. For example, the granting rights to other people may not only be for seeing Inbound and Outbound call history of a particular user, but also for seeing what the user's billing information is, what the user's statistical information is as far as what states he or she seems to call frequently, etc. Other attributes associated with the user may be frequency of telephone use, calling/called party's name and address, date/time stamp of the telephone call.

Further shown in FIG. 1 is another switching office, Switch-2 132 which is connected to telephone network 104. Similar to Switch-1 102, Switch-2 132 serves, in a predetermined geographic area, its own local subscribers, such as Mary 134 (telephone number 202-371-6644), Sam 136 (telephone number 202-371-4391), as well as other local generic subscribers, i.e., User-21 138 (symbolic telephone number #21 which is analogous to Mary or Sam's telephone number) and User-2N 140 (symbolic telephone number #2N which is also analogous to Mary or Sam's telephone number).

Switch-2 132 has processing unit 142, which is similar to processing unit 114 of Switch-1 102. In contrast to Switch-1, database DB2 144 is not co-located or locally located with processing unit 142. Instead, DB2 144 is remotely located on telephone network 104, as shown in FIG. 1. While DB2 144 is representatively located at a remote location from Switch-2 132, the structure of the database is analogous to DB1 116: user journals corresponding to users served by Switch-2 132 are contained within DB2 144. Thus, user journal 146 corresponds to user Mary 134, while user journals 148, 150, 152 are associated with user Sam 136, User-21 138 and User-2N 140, respectively, as illustrated in FIG. 1.

It is worth noting that while the composition of each journal in DB2 144 may be substantially the same as in database DB1 116 in terms of lists, i.e., Inbound list, Outbound list, Authorization list, it does not have to be. The list arrangement, as well as the type of lists, may vary significantly among databases. Alternatively however, many switches in the telephone network may share a common database.

A simple representative example will describe one aspect of the present invention. For example, when Sam 136 calls Bill 106, Sam's telephone number 202-371-4391 is recorded in Bill's journal 118, and in particular in Inbound list 126. If Bill 106 subsequently happens to call Sam 136, this transaction is also recorded in Bill's journal 118, i.e., Sam's number is recorded in Outbound list 128 of Bill's journal, as shown in FIG. 1. As further shown in FIG. 1, Mary 134 (202-371-6644), a local subscriber of Switch-2 132, has been authorized to access Bill's journal 118, as indicated in Authorization list 130. Thus, Mary 134 can browse through Bill's journal 118, automatically dial any of the inbound or outbound numbers in Bill's journal, and perform other call processing functions. These operations will be described in detail in connection with flowcharts of FIGS. 2 through 7 below.

A system and method are provided for automatic call processing according to foregoing inbound and outbound calls to arbitrary delegates. Each user in a telephone network has the ability to automatically dial telephone numbers of previously made calls. Through the use of brief command invocations, a user in a telephone network is enabled with the following functions:

(1) Dial last called number from the user's telephone.
(2) Dial last calling number to the user's telephone.
(3) Dial last called number from someone else's telephone provided there is an access privilege.
(4) Dial last calling number to someone else's telephone provided there is an access privilege.
(5) Browse history of outbound and inbound calls for my telephone and provide instant auto-dial from the browse session.
(6) Browse history of outbound and inbound calls for someone else's telephone if there is an access privilege, and provide instant auto-dial from the browse session.
(7) Grant or revoke access rights to other users in the telephone network for the purpose of controlling functions (3), (4) and (6) above, as well as access to a user's variety of telephone network data. Specifications may be made with wildcards to allow defining sets of access rights with a single specification.

The user is further enabled with:

(8) Administration of whether to track inbound and/or outbound calls, and how to classify the call to be tracked (successful calls only, any call attempts, etc.).
(9) Administration for browsing current access privileges and maintaining those privileges.
(10) Administration for clearing current inbound/outbound history lists.

The above functions will now be described in detail with reference to FIGS. 2 through 7. FIG. 1 shows a block diagram of an administration aspect of the invention, i.e., the environment in which a user can change a forwarding number, a password, phone mail options, etc. In a PBX environment such as MCI or IBM, for example, a user has a predetermined code to dial into the administration interface. In a LEC environment, the user dials a special keypad sequence at his or her off-hook telephone (e.g. *65; like call forward *72) for access to the special service in order to accomplish the administration of the call processing according to one aspect of the present invention. In another embodiment in a LEC environment, the user dials a special telephone number to the special service.

Figure 2:
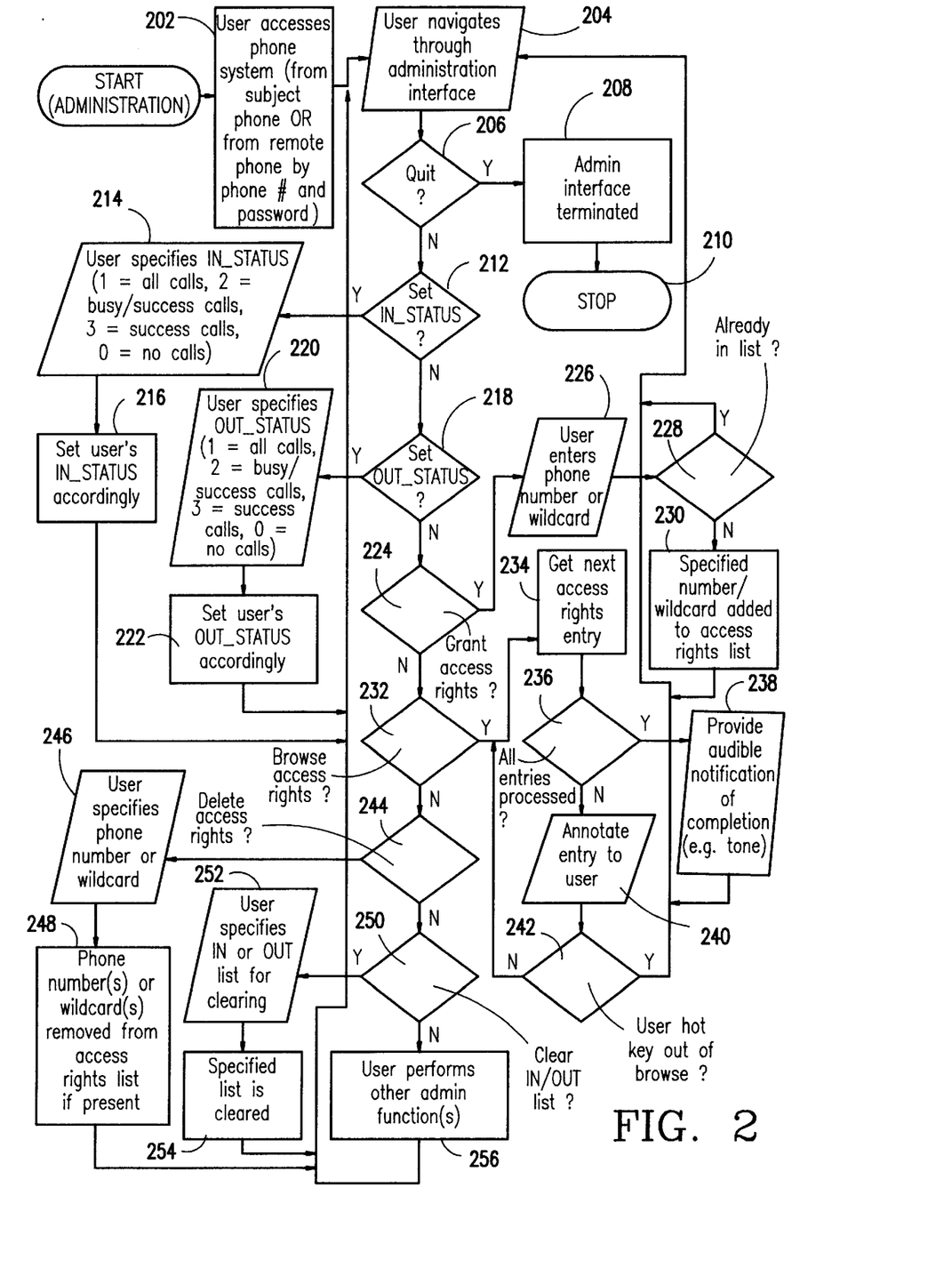
FIG. 2 depicts a flowchart for the administration aspect of the present invention in accordance with one embodiment.

As shown in FIG. 2, in step 202 a user accesses the phone system: in a PBX environment, the user may simply pick up a telephone and hit a special n-digit number. Alternatively, a special button on a telephone keypad may be allocated for transferring into the telephone mail system. Absent the PBX environment, i.e., in the world network, the user may actually dial a similar sequence or may dial a 7-digit or 10-digit number to gain entry into the service.

Once the user gets into the service, the navigation through the administration interface is performed via a telephone keypad interface using a menu system, as shown in step 204. Alternatively, Audio Response Unit (ARU) may be employed, so that the user is prompted to vocalize the menu commands, such as "please say 1." In step 206 a determination is made whether the user wants to quit the service. If so, the administration interface is terminated and so is the call in steps 208 and 210, respectively.

In step 212, an inquiry is made if the user desires to set Inbound call status with an IN_STATUS variable. If so, then the user specifies through the menu interface whether he or she wants to track (1) all calls that are made to the particular telephone, (2) only the busy or successfully completed calls that are made to that phone, (3) only the successfully completed calls, or (4) none of the calls, i.e., no tracking of inbound calls is desired. Representative keys on the keypad or voice responses corresponding to the above options may be 1, 2, 3 and 0, as illustrated in step 214. The difference between options (1) and (2) is that one can track calls that are not answered with option 1: that is, the telephone rings and rings, and never gets picked up. After the IN_STATUS variable gets set according to the selected option, as shown in step 216, the user goes back to the top of the menu and continues navigating through the administration interface.

Further option—in step 218—is to set the outbound call status with an OUT_BOUND variable. Similar to the inbound call status, the user indicates if he or she wants to track (1) all calls that are made from the particular telephone, (2) only the busy or successfully completed calls that are made to that phone, (3) only the successfully completed calls, or (4) none of the calls, i.e., no tracking of inbound calls is desired. Again, representative keys on the keypad or voice responses corresponding to the above options may be 1, 2, 3 and 0, as illustrated in step 220. Following the setting of the OUT_STATUS variable in step 222 in accordance with the selected option, the user returns to the beginning of the menu and continues navigating through the administration interface.

Next, a determination is made whether the user wants to grant access rights to other people on the network to get access to his or her resources, as shown in step 224. For example, in the LEC or PBX network, the user may specify a telephone number, or a telephone number wildcard to specify a plurality of telephone numbers, which offer users access rights to the user journal. In other words, the user may grant rights to everybody who has the 566* extension in his or her PBX system which assigns extensions by floors and/or areas of the building. A user may grant rights to everybody in the state of New Jersey with a 609 area code (e.g., 609*). The wildcard can take many forms depending on the particular embodiment of the present invention. So in step 226, the user specifies a telephone number which may or may not include the wildcard characters. If the telephone number already exists on the Authorization list (step 228), then the user is taken back to the beginning of the menu and given the option of continuing the navigation through the administration interface. Otherwise, the telephone number is added to the list in step 230, and the process returns to step 204.

Another option offered to the user is the browsing of the currently set access rights, as determined in step 232. If the browsing is selected, the user is given the Authorization list of numbers, including wildcard characters, that the user currently has given rights to access his or her journal. Step 234 retrieves the first or next Authorization list entry. A decision is made whether all entries on the list are processed in step 236, i.e, whether the user browsed through all the telephone numbers on the list. Thus, a loop is entered where each access right entry is processed by going through the Authorization list. If the end of the list is reached, then the user is given an audible notification, such as a voice synthesized message or a tone that all entries on the list have been reviewed, in step 238, and the process is returned to the beginning of the menu (step 204). If, however, this is not the last entry on the list, the system annotates it by, for example, pronouncing a character associated with the telephone number (step 240).

Step 242 shows an exemplary hot key, such as a star (*) key, for terminating the browse operation. For example, the user may hit the star (*) key at any time during browse to terminate the annotation of access right entries, so that he or she does not have to browse through the remaining entries. If the hot key is not activated, then the process continues back to step 234 to continue processing through the loop by fetching one entry at a time and annotating it until all of them are processed, as explained above. If however step 242 determines the hot key was activated, step 242 continues back to step 204.

In step 244, an option of deleting an access rights entry is determined. For example, the user decides not to give a particular subscriber a continued access right to the journal. That is, the user does not want that subscriber to know whom the user calls, who calls the user, etc. Consequently, the user deletes the subscriber's access rights by specifying, in step 246, the telephone number, which may include the wildcard character. That entry is removed from the Authorization list in step 248. The process then returns to the top of the menu (step 204).

Another user option is to clear the inbound/outbound list, as determined in step 250. In other words, the user may decide to remove all information from the lists. To do this, the user specifies whether the inbound or outbound list is selected for clearing in step 252, and the specified list is then cleared in step 254. The process then returns to step 204 which was previously described.

If the user hasn't selected any of the functions mentioned above, i.e., setting IN_STATUS, setting OUT_STATUS, granting, browsing or deleting access rights, and clearing inbound/outbound list, then the user may proceed to other administrative functions (step 256).

Figures 3, 4:
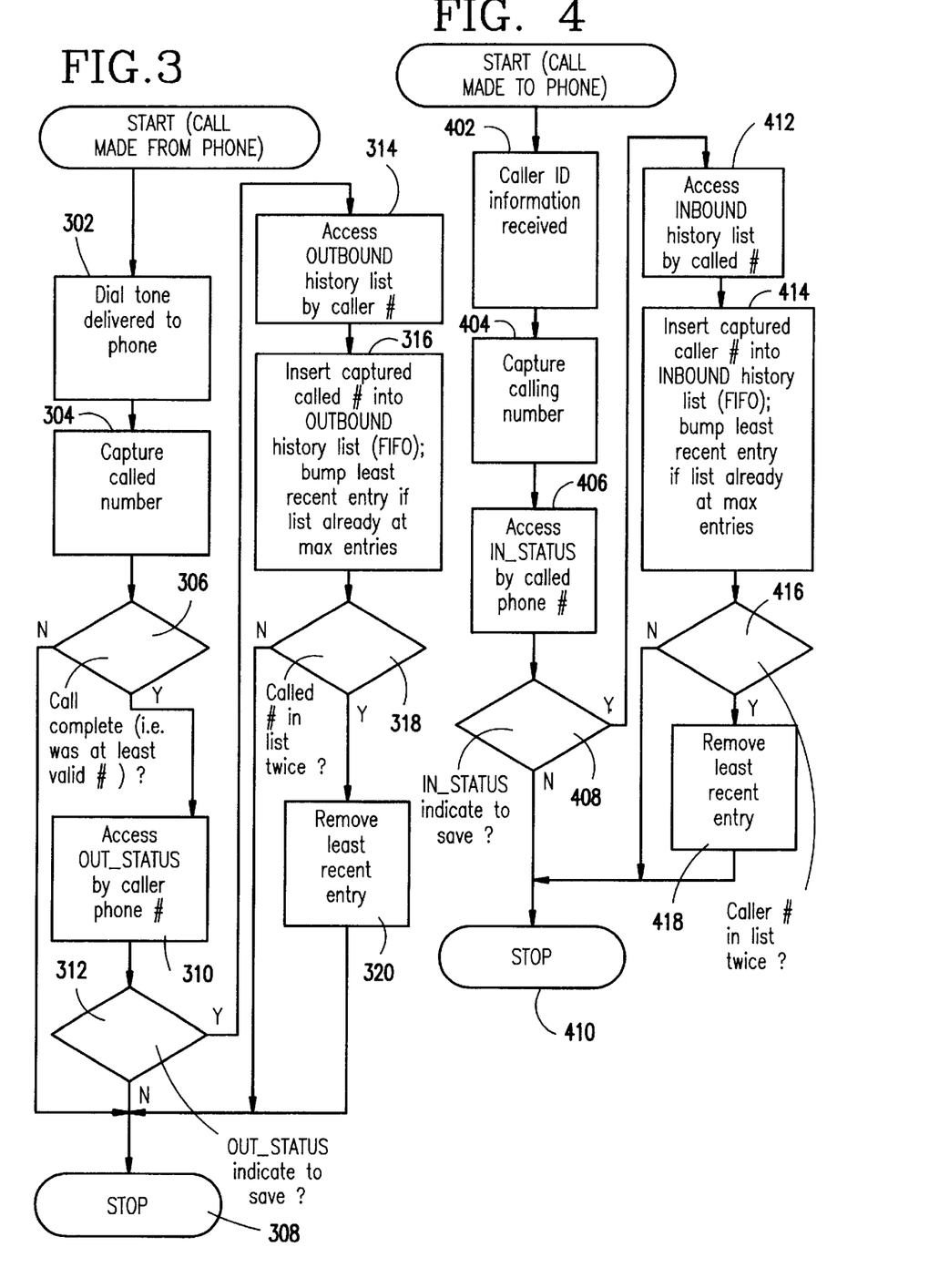
FIG. 3 depicts a flowchart for managing outbound calls in accordance with one aspect of the present invention.
FIG. 4 depicts a flowchart for managing inbound calls in accordance with another aspect of the present invention.

FIG. 3 shows a flowchart for a process performed on an originating switch according to one aspect of the present invention, i.e., preferably the switch that the telephone is connected to, such as a central office LEC or PBX. As soon as the user picks the telephone receiver, a dial tone is delivered, as shown in step 302. It is assumed that the numbers are dialed, and the called number is captured in step 304. A decision is then made whether the call was at least valid (step 306). If an error tone is received that says a non-working number has been dialed, this call attempt is not going to count as a valid call, and the process is going to end (step 308). Hence, certain conditions have to be met in order to consider the telephone call for tracking. These conditions may include the caller getting a busy signal, the telephone ringing with an answer or ringing without an answer, or the telephone not ringing at all since it may be picked up before the ringing starts. Whatever the case may be, at a minimum the caller gets through to a valid telephone number.

If the call was completed, then the access is made to the caller's OUT_STATUS variable using the caller's known telephone number as a handle, as shown in step 310. Based on the status of the OUT_STATUS variable, it is determined whether the outbound telephone number must be saved (step 312). If the OUT_STATUS indicates not to track anything, then that number is not saved and the process is stopped in step 308. If the caller gets a busy signal and the OUT_STATUS is set to successfully completed calls only, then that telephone number is also not saved.

However, if, for example, the OUT_STATUS variable is set to the option of tracking all calls made from the telephone, then the save process is carried out. In this case, the caller's Outbound list in the user journal is accessed in the database using the caller's number as a handle (step 314). Next, the captured called number is inserted into the caller's Outbound list using First-In-First-Out (FIFO) order. If the maximum number of entries on the list has been reached, then the least recent entry is deleted from the list to make room for the new entry, as shown in step 316. It is then determined if this number is already in the outbound history list (step 318). If so, the least recent entry is removed and one instance of it is kept in the Outbound list of the journal in step 320. The process is subsequently terminated in step 308, as shown in FIG. 3.

FIG. 4 shows the flowchart for the relevant call processing at a terminating switch in accordance with the present invention. In step 402, caller id information is received at the switch. It is understood by those skilled in the art that in the global network using SS7 out-of-band signaling, such operations as capturing caller number, receiving caller identification (ID), etc., takes place as a result of the out-of-band call set up and before voice in-band portion of the call goes through. Thus, substantially all the processing according to the present invention is performed before the voice communication path is set up.

Continuing with the description of FIG. 4, after the caller ID information is received, the calling number is captured in step 404. Next, the IN_STATUS variable for that particular telephone is accessed using the called telephone number as a handle (step 406). At this point, a process similar to the IN_BOUND call processing occurs: that is, it is determined whether the inbound telephone number must be saved based on the IN_STATUS variable (step 408). If the IN_STATUS indicates not to track anything, then that telephone number is not saved and the process is stopped in step 410. Similarly, if a busy signal is received, and the IN_STATUS is set to successfully completed calls only, then the caller's number is also not saved.

However, if, for example, the IN_STATUS is set to the option of tracking all calls made to the telephone, then the save process is carried out. The Inbound list in the called party's journal is accessed in the database using the called number as a handle (step 412). As previously stated, the database may be local to the switch, or remotely located on the network. Furthermore, to retrieve the appropriate user journal, the database access may involve a communications protocol, such as TCP/IP for example, and/or other transactions known to those skilled in the art of database transactions.

Next, the captured caller number is inserted into the called party's Outbound list using First-In-First-Out (FIFO) order. If the maximum number of entries on the list has been reached, then the least recent entry is deleted to make room for the new entry, as shown in step 414. It is then determined if this number is already in the inbound history list (step 416). If so, the least recent entry is removed and one instance of it is kept in the journal in step 418. The process is subsequently terminated in step 410, as shown in FIG. 4.

For both aspects of the invention as described above in connection with FIGS. 3 and 4, various features may be saved in outbound and/or inbound lists of user journals. Thus, in addition to saving and inserting the telephone number, other features may be recorded, such as the calling or called party's name, address, date/time stamp of the call, as well as other attributes of a calling or called party, as previously discussed. In a similar manner, the Authorization lists may contain other information in which case step 240 of FIG. 2 may in fact annotate a user's name as well as other information.

Figure 5:
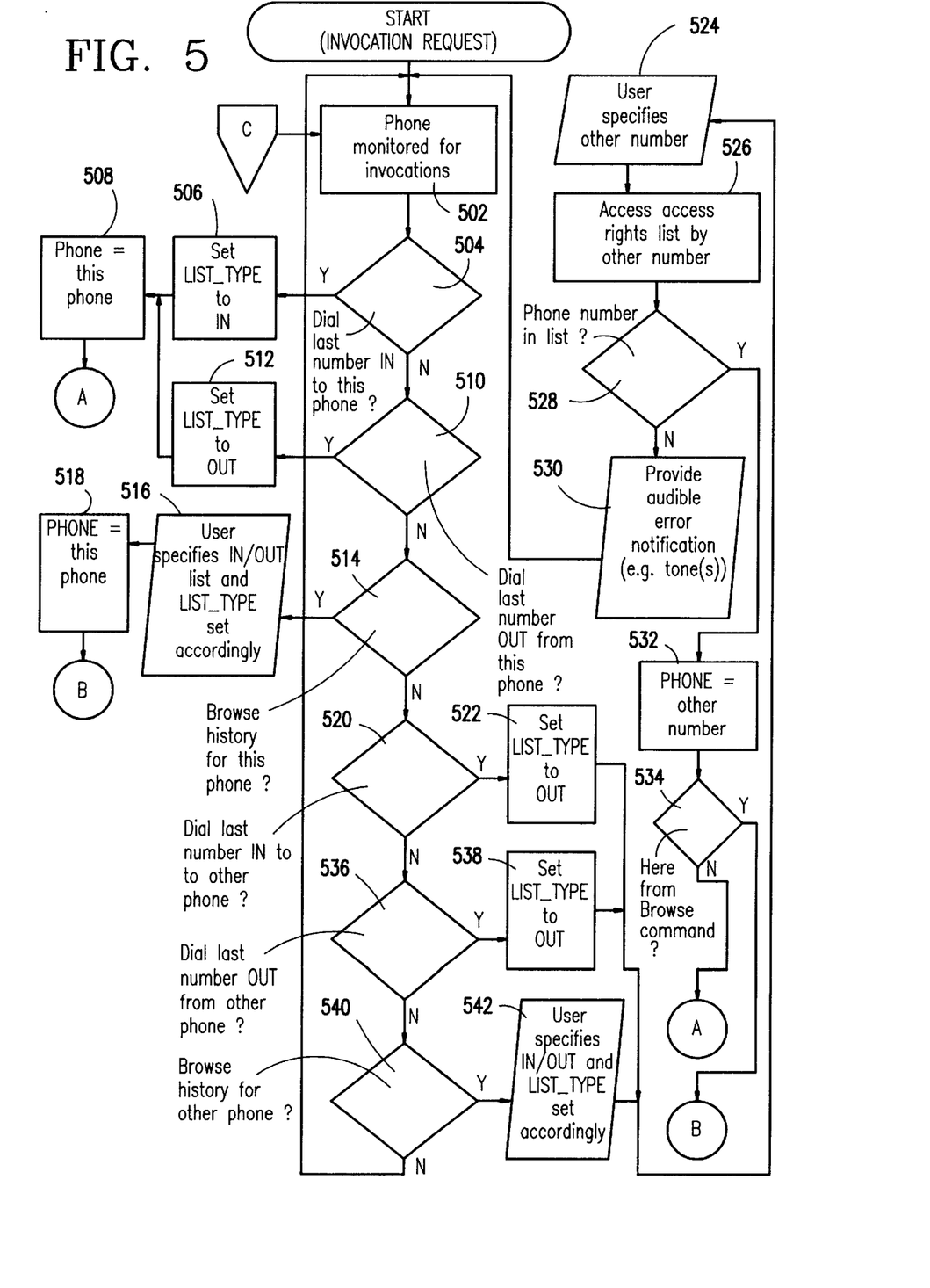
FIG. 5 depicts a flowchart for invoking a saved inbound or outbound number to or from an arbitrary telephone line in accordance with yet another aspect of the present invention.
Figure 6:
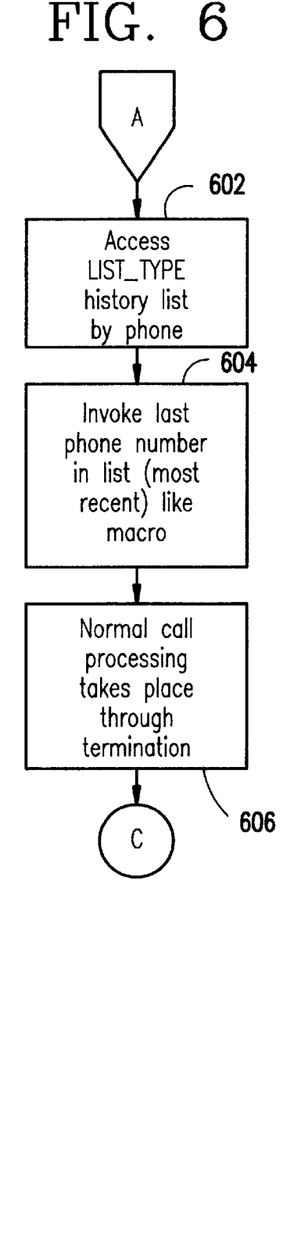
FIG. 6 depicts a flowchart of continued processing from FIG. 4 for invoking the last number, inbound or outbound, to and/or from a particular telephone line.
Figure 7:
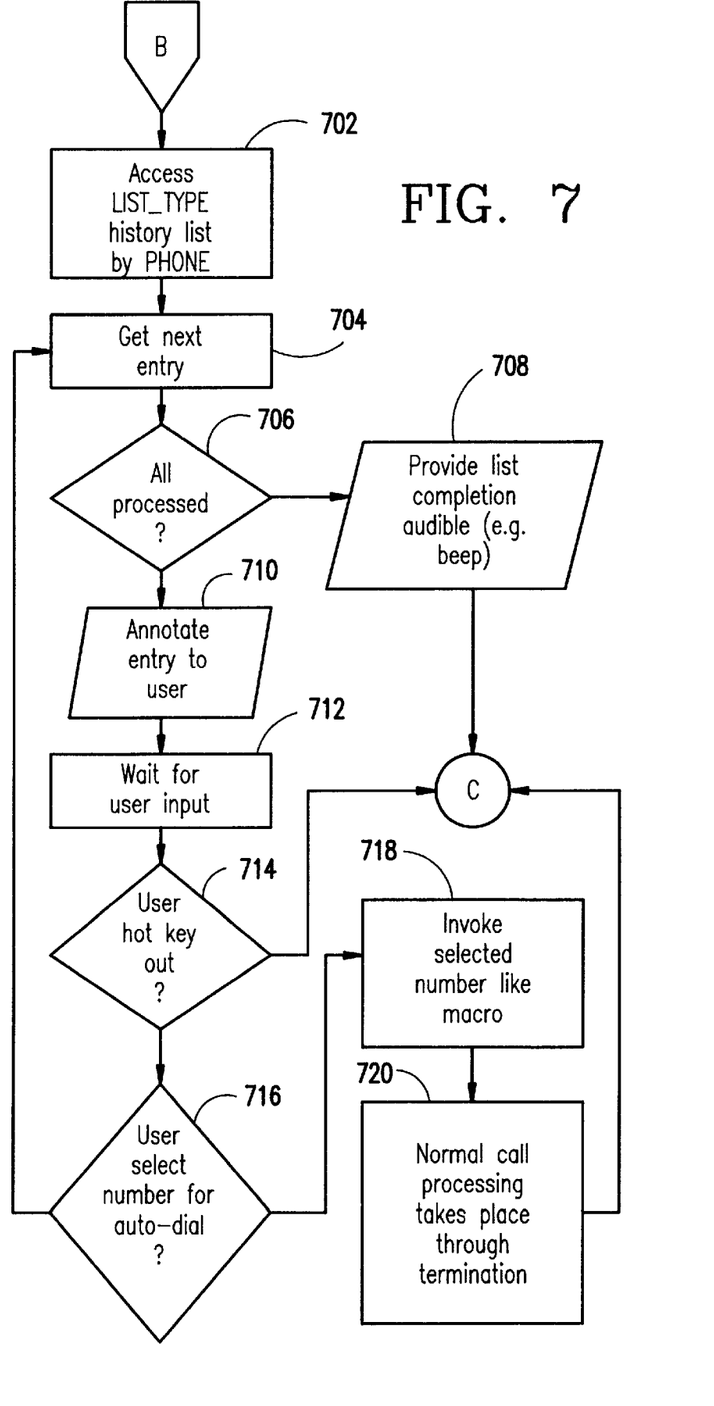
FIG. 7 depicts a flowchart of continued processing from FIG. 4 for invoking any number from a historical inbound list or historical outbound list associated with a particular telephone line.

FIGS. 5, 6 and 7 are related to each other, such that FIGS. 6 and 7 are an extension of FIG. 5 which shows a flowchart for invoking a saved inbound or outbound number to or from an arbitrary telephone line in accordance with an aspect of the present invention. Prior to describing the flowcharts in detail, it is noted that certain key sequences, i.e, beginning with a star (*) for example, are currently provided by a local telephone company for special services. These special services may include several aspects of the present invention, so that user commands are recognized in response to the activation of key sequences. The PBX environment employs similar schemes allowing substantially the same key sequences to access special services. In one representative embodiment of the present invention, looking at the middle vertical line of decision boxes in FIG. 5, the decision box titled "Dial last number IN to this phone" could be activated, for example, with a 1 sequence; decision box titled "Dial last number out from this phone" with 2 sequence; "Browse history for this phone" with 31; the 4 sequence is for "Dial last number IN to other phone;" and so on.

Next, a detailed description of FIGS. 5, 6 and 7 will follow. As shown in FIG. 5, telephones are monitored for command invocation upon receiving dial tones (step 502). As soon as the telephone gets the dial tone, the switch, monitoring what the telephone is doing, decides whether the request for dialing last number IN to this telephone has been made (for example, the **1 sequence has been entered) in step 504. If so, a variable called LIST_TYPE is set to IN(bound) in step 506, and a variable PHONE to this phone in step 508. The call processing then continues with step A in FIG. 6, where the IN(bound) list for this telephone is accessed using the requester's phone number (PHONE variable) as a handle, as shown in step 602. In step 604, the last telephone number in the list is invoked since according to the FIFO order that number will be the last one dialed. The telephone number may be invoked by issuing Dual Tone Multi Frequency (DTMF) signals as a macro, for example. Following this step, normal call processing takes place involving voice path set-up, etc. which is well known to skilled artisans (step 606). After that, the call processing routine goes back to C and, in particular, step 502 in FIG. 5 for monitoring the telephone for the special process invocation.

Substantially similar call processing takes place when it is determined that the request for dialing last number OUT from this telephone has been made (for example, the **2 sequence has been entered) in step 510. If so, the variable LIST_TYPE is set to OUT(bound) in step 512, and the variable PHONE to the phone number of this phone in step 508. The call processing then continues with step A in FIG. 6, where the OUT(bound) list for this telephone is accessed using the requester's phone number (PHONE variable) as a handle. In step 604, the last telephone number in the list is invoked by issuing Dual Tone Multi Frequency (DTMF) signals as a macro, for example. After that, normal call processing takes place (step 606). The call processing routine goes back to C and, in particular, step 502 in FIG. 5 for monitoring the telephone for further special process invocation.

Next, determination is made whether the user wishes to browse the history for his or her telephone in step 514. User, by providing key sequences, such as 31 or 32 for example, specifies whether the IN or OUT list respectively has been selected. Based on the user action in step 514, the variable LIST_TYPE is set accordingly. For example, if the user hits 31, the IN(bound) list is selected, and if it is 32, the OUT(bound) list is chosen (step 516). In step 518, the PHONE variable is set to the phone number of this phone, and the processing continues with step 702 in FIG. 7.

In step 702, IN(bound) or OUT(bound) list is accessed, whatever the case may be for this phone based on the variable LIST_TYPE. A loop is then entered such that each entry is retrieved sequentially in step 704. If all entries have been processed, as determined in step 706, an indication of the process completion is given, such as a tone, voice, beep, etc. The call processing routine then returns to step 502 in FIG. 5 for monitoring the telephone.

If, however, not all entries have been processed, then this particular entry is annotated to the user in step 710. The annotation procedure may include voice or phonetic pronunciation of the digits. Alternate list embodiments may include name, day/time, address annotation, etc. After the entry has been annotated, further user input is expected in step 712 until the user hits any key on his keypad, such as a hot key, i.e., a star (*), following a decision in step 714. In this case, the user terminates the processing by getting out of the service, and the process is returned to step 502 in FIG. 5. If the user activates a key for auto-dial, such as a pound (#) key, as determined by step 716, the selected number is automatically dialed in step 718. That is, the last number that was annotated is dialed like a macro using DTMF signals, for example, and normal call processing takes place in step 720. If the user selects neither the hot key for terminating the process nor the auto-dial key (i.e., selects any other key), the process returns to step 704 to continue annotating one entry after another from the particular list. Thus, the user has to press a key in order to advance to the next entry, and if the key is star (*), for example, the user exits the process, while if it is a pound (#) key, the user automatically dials the telephone number.

Another option in FIG. 5 is to dial last number into another phone, as shown in step 520. If so, IN(bound) list is assigned to the LIST_TYPE variable in step 522, and the user then specifies a number that he wishes to get the IN(bound) list information for in step 524. Alternatively, the user may indicate a number that he wishes to get the IN(bound) list information for as part of the command in step 520. For example, the user may enter **45694 which requests the IN(bound) list information for extension 5694.

After obtaining the other number in step 524, the appropriate Authorization list is accessed using that other number as a handle in step 526. In fact, step 526 may retrieve the entire journal for the other number. This may involve various communication protocols, whether in a PBX-switched environment or in the world network environment incorporating an out-of-band processing between switches to access the appropriate database. Hence, in the world network environment, the switches transfer information between each other via a predetermined protocol using a particular phone number for applicable request routing, and access the database via an X.25 data link protocol, for example.

In step 528, a decision is made if the requester's phone number is in the other number's Authorization list. If not, an error notification including a tone, message, etc., is provided to the user immediately indicating rights are not granted to the user. If the requester is determined to have rights to the other number (step 528) the PHONE variable is set to that other number (step 532), and the user is not here from a browse command (step 534), the call processing continues with step 602 of FIG. 6 which was described above. One embodiment may retrieve the entire journal for the other number in step 526 to prevent further communications required in steps 602 and 604. Otherwise steps 602 and 604 will perform the necessary communications using the other number in order to accomplish their processing. If the user is here, i.e., step 534, from a browse command, then the call processing continues with step 702 of FIG. 7 which was also described above.

Another option for the user is to dial last number out from an other phone as determined in step 536. If selected, the variable LIST_TYPE is set to the OUT(bound) list in step 538. The same steps are repeated as during the previously described option of dialing the last number IN to other phone: the user specifies the other number in step 524 (if not part of the command itself); the Authorization list according to that other number is accessed in step 526; a decision is made in step 528 if the requester's phone number is in the other number's Authorization list; if not, an error notification is provided to the user; if the requester is determined to have rights to the other number (step 528), however, the PHONE variable is set to that other number (step 532). Since the user is not here from a browse command (step 534), the call processing continues with step 602 of FIG. 6; if the user is here, i.e., step 534, from a browse command, then the call processing continues with step 702 of FIG. 7.

Still another option is to browse any history for an other phone in step 540. If selected, the LIST_TYPE variable is set accordingly in step 542 based on the specified list, either IN(bound) or OUT(bound) as determined by the particular type of browse command entered. The call processing then continues with step 524, as fully described above. The only difference from heretofore described is that after authorization validation is performed, step 534 will continue to step 702 of FIG. 7 because it was arrived to by way of a browse command. Processing in step 702 and thereafter has been described above. Step 526 may have retrieved the entire other number's journal to prevent communication in step 702. Otherwise step 702 will perform the necessary communications using the other number in order to accomplish processing.

It is understood, of course, that an error handling procedure is present throughout the navigation process. For example, if it is determined that a PBX extension does not exist and obviously cannot be added or deleted to/from any list, an error handling procedure in invoked. This may include an audible signal, a tone or a message stating that the error has occurred and, optionally, the nature of the error.

The invention is particularly useful for people who have more than one telephone device, or network-connected device. Let's say that a customer dialed a manager's assistant. The manager can automatically dial the customer just by having access rights to his or her assistant's telephone. That is, the manager can automatically dial numbers that were called to or from the assistant's telephone. Hence, management of calls thereto or therefrom are conveniently associated with automatic dialing from another connected device. It is also useful for team users, such as in the PBX environment or any place that has multiple users that wish to share telephone access and wish to share automatic browsing and know the dialing numbers. So, people working together will want to use this feature because they operate as a team.

It is apparent from the above description that in accordance with one aspect, the present invention provides, among other things, auto-dialing of telephone numbers associated with previous calls to and/or from arbitrary telephones.

In accordance with another aspect, the present invention provides the ability for a first user to grant access rights to other users in a telephone network for the purpose of allowing the other users to auto-dial phone numbers associated with previous calls to and/or from the telephone of the first user.

In accordance with yet another aspect, the present invention provides the ability to instantly invoke a call during browsing of the history of calls made to and/or from arbitrary telephones.

In accordance with still another aspect, the present invention provides the ability for a first user to grant access rights to other users in a telephone network for the purpose of allowing the other users to invoke a call during browsing of the history of calls made to and/or from the first user's telephone.

Since those skilled in the art can modify the disclosed specific embodiment without departing from the spirit of the invention, it is, therefore, intended that the claims be interpreted to cover such modifications and equivalents.

What is claimed is:

1. A telecommunications system for processing telephone calls according to foregoing inbound and outbound calls to arbitrary delegates, comprising:

at least one switching office, located in a network of a telecommunications service provider, for establishing a voice path between a calling and a called party;

a plurality of telecommunications service subscribers, including said calling party, connected to said switching office, said plurality of telecommunications service subscribers desiring to obtain a voice communication among themselves;

a processor, located in said switching office, for carrying out a sequence of instructions embodied in a computer-readable medium;

a database connected to said processor, for providing a computer file which includes computer-readable information about a service subscriber in said plurality of telecommunications service subscribers, said computer-readable information being arranged as a user journal corresponding to said service subscriber, wherein said user journal includes a first list comprising at least one telephone number of a first set of service subscribers initiating a telephone call to said service subscriber, a second list comprising at least one telephone number of a second set of service subscribers receiving a telephone call from said service subscriber, and a third list comprising at least one telephone number of a third set of service subscribers who are authorized to access said first and second lists, wherein said processor, responsive to said sequence of instructions generated from commands input by a user, accesses said database to perform a call processing function using either said telephone number of said first set of service subscribers or said telephone number of said second set of service subscribers located in said first and second lists, respectively.

2. The system according to claim 1, wherein said database is local to said switching office.

3. The system according to claim 1, wherein said database is remotely located from said switching office.

4. The system according to claim 3, further comprising a second switching office located in said network such that said called party is connected to said second switching office, wherein said remotely located database includes said user journal corresponding to said called party.

5. The system according to claim 1, wherein said user journal further comprises information selected from the following: billing information of said user, a date and a time recordation of a telephone call initiated by said service subscriber, a date and a time recordation of a telephone call placed to said service subscriber, a name and an address of said calling and called party, and a frequency of telephone use of said subscriber.

6. The system according to claim 1, further comprising Private Branch Exchange (PBX) equipment communicatively coupled to said switching office, wherein said plurality of telecommunications service subscribers are connected to said switching office via said PBX equipment.

7. The system according to claim 1, wherein said call processing function includes one of the following operations: dialing a last called number from said subscriber's telephone, dialing a last calling number to said subscriber's telephone, dialing said last called number from another service subscriber's telephone if an access privilege has been obtained, dialing said last calling number to said another service subscriber's telephone if said access privilege has been obtained, browsing the history of outbound and inbound calls for said subscriber's telephone and providing an instant auto-dial during said browsing, browsing the history of outbound and inbound calls for said another service subscriber's telephone if said access privilege has been obtained and providing said instant auto-dial during said browsing, granting or revoking access rights to other subscribers in said network for the purpose of controlling said functions, providing an administration of tracking inbound or outbound calls, providing an administration of browsing current access privileges and maintaining those privileges, and providing an administration of clearing current inbound or outbound lists.

8. The system according to claim 1, wherein a request for carrying out said call processing function is input via a telephone keypad used as an interface by said subscriber who presses appropriate keys on said keypad in response to a menu-driven program.

9. The system according to claim 1, wherein a request for carrying out said call processing function is input via an audio response unit used as an interface by said subscriber who vocalizes the selection of said call processing function in response to a menu-driven program.

10. The system according to claim 1, wherein said telephone number includes a wildcard character taking place of at least one digit designating a plurality of telephone numbers in said network.

11. A method of processing telephone calls according to foregoing inbound and outbound calls to arbitrary delegates in a telecommunications network, comprising the steps of:

connecting to a switching office a plurality of telecommunications service subscribers desiring to obtain a voice communication among themselves to establish a voice path between a calling and a called party via said switching office located in said network of a telecommunications service provider, said switching office including a processor to carry out a sequence of instructions embodied in a computer-readable medium;

connecting a database to said processor;

creating a computer file in said database, said file including a computer-readable information about a service subscriber in said plurality of telecommunications service subscribers;

arranging said computer-readable information as a user journal corresponding to said service subscriber, wherein said user journal includes a first list comprising at least one telephone number of a first set of service subscribers initiating a telephone call to said service subscriber, a second list comprising at least one telephone number of a second set of service subscribers receiving a telephone call from said service subscriber, and a third list comprising at least one telephone number of a third set of service subscribers who are authorized to access said first and second lists;

generating said sequence of instructions from commands input by a user;

accessing said database in response to said generating; and performing a call processing function using either said first set of service subscriber's telephone number or said second set of service subscriber's telephone number located in said first and second lists, respectively.

12. The method according to claim 11, further comprising the step of locally placing said database with respect to said switching office.

13. The method according to claim 11, further comprising the step of remotely locating said database with respect to said switching office.

14. The method according to claim 13, further comprising the steps of locating a second switching office in said network and connecting said called party to said second switching office, wherein said remotely located database includes said user journal for said called party.

15. The method according to claim 11, wherein the step of performing said call processing function includes one of the following operations: dialing a last called number from said subscriber's telephone, dialing a last calling number to said subscriber's telephone, dialing said last called number from another service subscriber's telephone if an access privilege has been obtained, dialing said last calling number to said another service subscriber's telephone if said access privilege has been obtained, browsing the history of outbound and inbound calls for said subscriber's telephone and providing an instant auto-dial during said browsing, browsing the history of outbound and inbound calls for said another service subscriber's telephone if said access privilege has been obtained and providing said instant auto-dial during said browsing, granting or revoking access rights to other subscribers in said network for the purpose of controlling said functions, providing an administration of tracking inbound or outbound calls, providing an administration of browsing current access privileges and maintaining those privileges, and providing an administration of clearing current inbound or outbound lists.

* * * * *